United States Patent [19]

Nishikawa

[11] Patent Number: 4,707,746

[45] Date of Patent: Nov. 17, 1987

[54] PROJECTION TELEVISION RECEIVER WITH A RETRACTABLE REFLECTOR

[75] Inventor: Shunji Nishikawa, Osaka, Japan

[73] Assignee: Nec Home Electronics Ltd., Osaka, Japan

[21] Appl. No.: 899,580

[22] Filed: Aug. 25, 1986

[30] Foreign Application Priority Data

Aug. 31, 1985 [JP] Japan ............................ 60-133693[U]

[51] Int. Cl.$^4$ .............................................. H04N 5/74
[52] U.S. Cl. ...................................... 358/231; 358/64; 358/237; 358/254
[58] Field of Search ............... 358/231, 237, 238, 254, 358/60, 64

[56] References Cited

U.S. PATENT DOCUMENTS 2,285,509  6/1942  Goshaw .............................. 358/238
3,943,282  3/1976  Muntz ................................. 358/238
4,400,736  8/1983  Weiss .................................. 358/254
4,417,273  11/1983  Kloss .................................. 358/237

FOREIGN PATENT DOCUMENTS 94285   6/1983   Japan .................................. 358/254
230385  12/1984  Japan .................................. 358/64
496835  12/1938  United Kingdom ................ 358/254

Primary Examiner—Tommy P. Chin
Attorney, Agent, or Firm—Sughrue, Mion, Zinn, Macpeak & Seas

[57] ABSTRACT

A projection television receiver using a reflector between a projection tube and a screen. The reflector is attached to a rear cover of the cabinet which is rotatable between a retracted and projected position. In the retracted position, the receiver is compact and easily shipped while the projected position is required during operation.

9 Claims, 5 Drawing Figures

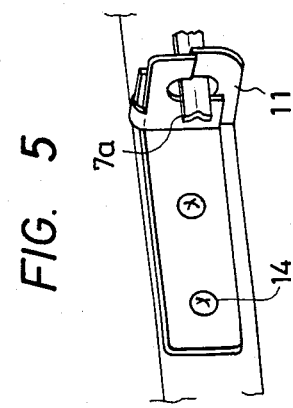
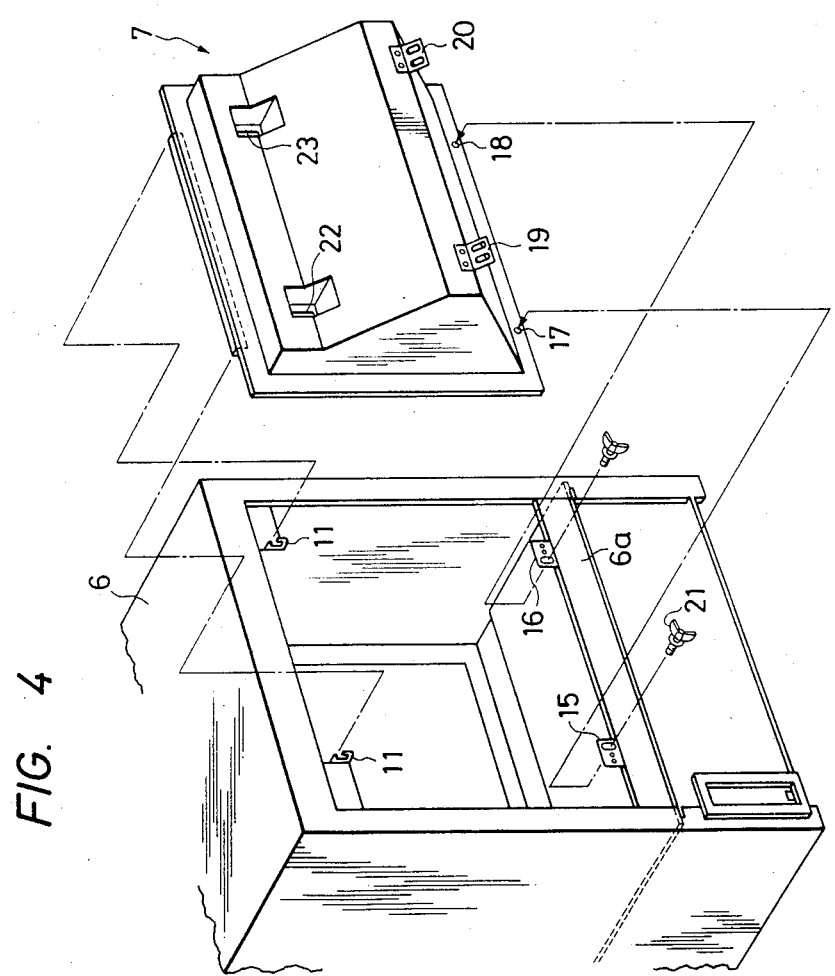

PROJECTION TELEVISION RECEIVER WITH A RETRACTABLE REFLECTOR

BACKGROUND OF THE INVENTION

1. Field of the Invention

This invention relates to the construction of a cabinet for a projection television receiver.

2. Background Art

FIG. 1 is a schematic diagram of a conventional projection television receiver. A projection tube 1 plays back television signals and projects an image though an optical lens 2 mounted on the front surface of the projection tube 1. A first reflector 3 arranged opposite to the optical lens 2 and in the forward section of a cabinet reflects the image toward a second reflector 4 arranged opposite to the first reflector 3. A screen 5 directly receives and transmits the light reflected from the second reflector 4. Thus the light produced by the projection tube 1 is projected onto the screen 5 via the optical lens 2 and the reflectors 3 and 4, whereby images are displayed.

In such a conventional apparatus, an enlarged image is obtained from the projection tube 1 with an optical distance maintained therebetween through an optical system comprising the reflectors 3 and 4 by causing the second reflector 4 to reflect light directly onto the screen 5. For that reason, the reflector 4 for reflecting light directly in the screen 5 must be arranged in the rearward section of the cabinet opposite to the screen 5 in such a manner that its reflective surface intersects that of the screen 5. As the reflective surface of the second reflector 4 is not allowed to be set parallel to the surface of the screen 5, the cabinet has disadvantages in that, for instance, it will unavoidably become large and thus impractical to transport.

SUMMARY OF THE INVENTION

The present invention is intended to remedy such shortcomings. In particular, it is an object of this invention to provide a projection television receiver that is easy to transport.

The invention is a projection television receiver wherein, apart from a main cabinet, there is formed, on the rear face of the main cabinet, a sub-cabinet for supporting a reflector for reflecting light toward a screen which directly displays an image projected from a projection tube. The sub-cabinet is retractable in such a manner that the reflector side of the sub-cabinet protruding from the rear face of the main cabinet during the use of the television may be retracted into the housing when the receiver is not in use, as occasion demands.

A cabinet block for supporting the reflector for directly reflecting light toward the screen is formed with the sub-cabinet as an additional body of the main cabinet. The reflector side of the sub-cabinet can thus be retracted into the main cabinet according to the present invention. Consequently, the sub-cabinet can be retracted, if necessary, so as to minimize its protrusion from the rear face of the main cabinet.

BRIEF DESCRIPTION OF THE DRAWINGS

FIG. 4 is a rear perspective view of FIGS. 2 and 3 and includes a possible alternative embodiment.

FIG. 5 is a perspective view showing details of portions of the projection television receiver of FIGS. 2 and 3.

DETAILED DESCRIPTION OF THE PREFERRED EMBODIMENTS

Figure 1:
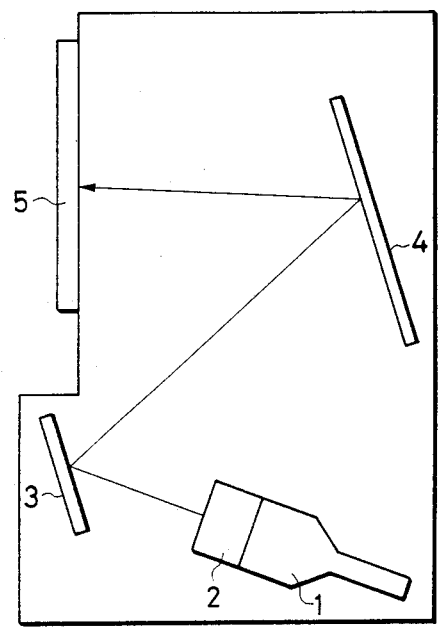
FIG. 1 is a schematic side view of a conventional projection television receiver.
Figure 2:
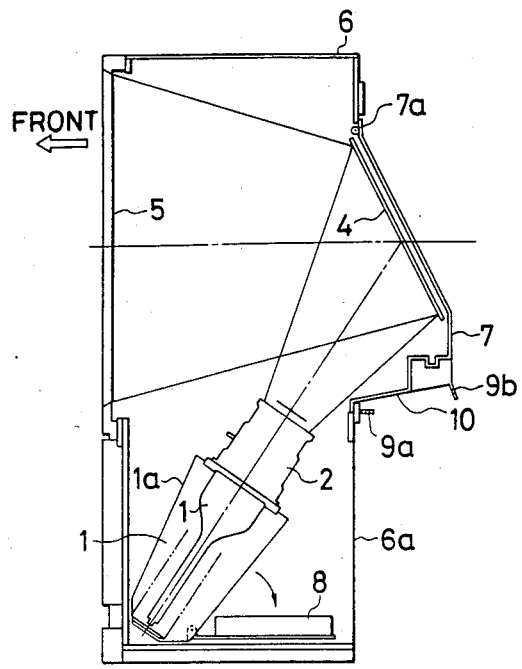
FIGS. 2 and 3 are schematic diagrams illustrating a projection television receiver embodying the present invention.

Referring now to FIGS. 1 and 2, an embodiment of the present invention will be described.

Figure 3:
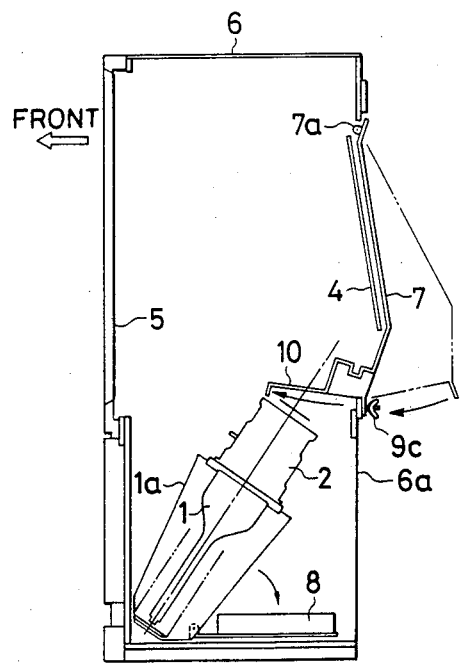

In FIGS. 2 and 3, there is shown a cabinet 6 which supports a projection tube 1 and a screen 5 in desired positions. The projection tube 1 can be rotated to lie flat when the receiver is not in use. A back cover 7 is attached to the cabinet 6 and supports a reflector 4. The back cover 7 can be swung about an axis using a bar 7a as a fulcrum. The bar 7a is installed at the upper end of the inclined surface of the reflector 4. A magnet installed on the inside bottom of the back cover 7 is magnetically attractable by a magnet installed on a lower back wall 6a of the cabinet 6. An electric circuit 8 is used to rotatably drive the projection tube 1 between flat and inclined positions.

The projection television receiver thus constructed with the back cover 7 in the protruded position shown in FIG. 2 makes it possible to look at an enlarged image on the screen 5. The receiver is also made temporarily compact by retracting the back cover 7, as shown in FIG. 3 using the bar 7a as a fulcrum and rotating the lower face 10 of the back cover 7 into the rearward section of the main cabinet 6. The back cover 7 is prevented from swinging while the television receiver is being carried about as it is firmly fixed to the cabinet 6 by the magnetic force of the magnets stuck together.

As extraneous substances may penetrate inside the cabinet 6 through the gap between the back cover 7 and the cabinet 6, a bellows should be connected between the lower face 10 of the back cover 7 and the back wall 6a. In this case, it is not necessary to use the magnets. The bellows prevent extraneous matter from penetrating inside by directly attaching the back cover 7 to the cabinet 6 without a gap. With the bellows member thus employed, a board member may be attached with a wing-nut to more surely prevent extraneous substances from penetrating inside.

The embodiment illustrated in FIGS. 2 and 3 does not use magnets but instead has a threaded screw 9a projecting from the rear wall 6a of the cabinet 6. The screw 9a is aligned with a pass hole 9b in a lower rear lip of the back cover 7. When the back cover 7 is in the retracted position a wing-nut 9c is fastened to the screw 9b and presses the lip against the rear wall 6a of the cabinet 6. If the magnets were used they would be disposed in place of the screw 9a and the pass hole 9b.

Further details are shown in the near perspective view of FIG. 4. Attached to the top of the back of the cabinet are two hooks 11 for receiving the bar 7a.

The bar 7a is shown in FIG. 5 with its one end inserted into the hook 1. Then the hook 11 is covered by an L-plate attached to the cabinet 6 by screws 14.

Returning to FIG. 4, at the bottom of the back opening in the cabinet 6 are two tabs 15 and 16, each having a pass slot and two tapped holes. At the front bottom of the back cover 7 are two tapped holes 17 and 18 and at the back bottom of the back cover 7 are two tabs 19 and 20, each having two pass slots.

When the receiver is being shipped or otherwise made compact, two or four wing-nuts 21, having threaded screw ends, are passed through the pass slots of the tabs 19 and 20 attached to the back cover 7 and then are screwed into the tapped holes of the tabs 15 and 16 attached to the cabinet 6. Thus the back cover 7 is partially retracted into the cabinet 6. On the other hand, when the receiver is being used, two wing-nuts 21 are passed through the pass slots in the tabs 15 and 16 attached to the cabinet 6 and then screwed into the tapped holes 17 and 18 in the back cover 7. Thus, the back cover 7 is securely projected to the rear. Not illustrated in FIG. 4 are two side covers covering the gaps between the back cover 7 and the sides of the cabinet 6.

In an alternative embodiment, the back cover 7 has two vertical slots 22 and 23 formed near its top. These slots 22 and 23 are preferably covered at a distance on the rear side by dust caps. The slots fit into the hooks 11 and provide sufficient rotational freedom to allow the back cover 7 to assume both its retracted and projected positions. Of course, the hooks 11 need to be located closer to the vertical center-line than illustrated in FIG. 4 for this alternative embodiment. By means of the slots 22 and 23, the bar 7a and L-plates 13 can be eliminated.

The present invention may also be applied to a projection television receiver having a first reflector 3 of FIG. 1.

As set forth above, the present invention has practical advantages in that, for instance, the television receiver can be made temporarily smaller in size and handy to carry about because it is possible to adjust the degree of protrusion of the cabinet back supporting the reflector for directly reflecting light in the screen from the rear face of the main cabinet.

What is claimed is:

1. A video signal projection device, comprising:
   a projection tube (1) for projecting an image contained in a video signal;
   a screen (5) having a first surface onto which said image is projected and a second surface facing in a direction opposite to said first surface for visibly displaying said image for a viewer to observe;
   a reflector (4) for reflecting said projected image onto said first surface of said screen;
   a generally rectangular cabinet (6) for containing said projection tube, said cabinet having a first longitudinal side for supporting said screen and a second longitudinal side in which an opening is provided, said second longitudinal side being opposite to said first longitudinal side and being spaced a predetermined distance from said first side;
   a sub-cabinet (7,10) mounted to said cabinet and disposed in said opening in said second longitudinal side for supporting said reflector, said sub-cabinet being movable between a first mounted position and a second mounted position, said second position disposing said reflector to reflect said projected image onto said first surface of said screen, wherein a first distance between said first longitudinal side and a distal portion of said sub-cabinet farthest from said first longitudinal side when said sub-cabinet is in said first position is substantially equal to said predetermined distance and a second distance between said first longitudinal side and the distal portion of said sub-cabinet when said sub-cabinet is in said second position is substantially greater than said first distance, said sub-cabinet having means to cover said opening when said sub-cabinet is in said second position.

2. A video signal projective device as recited in claim 1, wherein said projection tube is a television projection tube receiving television signals.

3. A video signal projection device as recited in claim 1, further comprising a hinge between said cabinet and said sub-cabinet about which said sub-cabinet rotates between said first and second positions.

4. A video signal projection device as recited in claim 3, wherein said hinge comprises at least one pin attached to said sub-cabinet rotatably fitted into two holders attached to said cabinet.

5. A video signal projection device as recited in claim 3, wherein said hinge comprises two slots formed in said sub-cabinet and two hooks attached to said sub-cabinet onto which said slots are inserted.

6. A video signal projection device as recited in claim 3, further comprising fastening means for fastening said sub-cabinet to said cabinet in said first position.

7. A video signal projection device as recited in claim 6, wherein said fastening means are threaded fastening means.

8. A video signal projection device as recited in claim 7, further comprising second threaded fastening means for fastening said sub-cabinet to said cabinet in said second position.

9. A video signal projection device as recited in claim 1, wherein said projection tube is disposed so as to project said image onto said reflector, said cabinet further including third and fourth sides which oppose one another and join said first and second sides, and a top and a bottom which oppose one another and are connected to all of said sides, and wherein said sides, said top and said bottom together are disposed to prevent light from entering said cabinet.

* * * * *